United States Patent [19]
Nishizawa et al.

[11] Patent Number: 4,842,781
[45] Date of Patent: Jun. 27, 1989

[54] COLORED POLARIZING FILM AND METHOD OF MAKING SAME

[75] Inventors: Tsutomu Nishizawa; Yasuyuki Yamada, both of Oomuta; Junichi Fujio; Shin Hosonuma, both of Nagoya, all of Japan

[73] Assignee: Mitsui Toatsu Chemicals, Inc., Tokyo, Japan

[21] Appl. No.: 141,839

[22] Filed: Jan. 11, 1988

Related U.S. Application Data

[62] Division of Ser. No. 584,911, Feb. 29, 1984, abandoned.

[51] Int. Cl.$^4$ .............................................. C09K 3/00
[52] U.S. Cl. ...................................... 264/1.3; 524/84; 524/87; 524/89; 524/190; 524/207; 524/208; 524/242; 524/259; 524/325; 524/358; 524/467; 524/485; 524/285; 524/605; 524/606
[58] Field of Search ....................... 524/242; 264/1.3

[56] References Cited

U.S. PATENT DOCUMENTS 2,246,087  6/1941  Bailey ...................................... 33/66
3,846,369  11/1974 Whyte ................................. 260/40 R

*Primary Examiner*—C. Warren Ivy
*Attorney, Agent, or Firm*—Fisher, Christen & Sabol

[57] ABSTRACT

Disclosed is a colored polarizing film having excellent durability which comprises (a) an organic polymer film or sheet and (b) at least one dichroic dye having an azo, anthraquinone, thioindigo, perylene or phthalone structure containing no water-soluble group. Also disclosed is a method of making a colored polarizing film using an organic polymer film or sheet formed of a polyamide or polyester resin, which comprises the steps of (a) blending (preferably, dry blending) a dichroic dye with the resinous polymer in advance, (b) melting the resulting blend and forming it into a film, and then (c) stretching the film in at least one direction.

3 Claims, No Drawings

COLORED POLARIZING FILM AND METHOD OF MAKING SAME

This is a divisional application of application Ser. No. 584,911, filed Feb. 29, 1984, now abandoned.

BACKGROUND OF THE INVENTION

Recently, with the advance of liquid-crystal display units, color display devices using colored polarizing films to permit the arbitrary selection of a color are being developed. Among others, there is an eager demand for colored polarizing films which have excellent thermal resistance, moisture resistance, weather resistance and the like and are suitable for use under high-temperature conditions or in an outdoor environment.

Among conventional polarizing films using an organic polymer film, a polyvinyl alcohol film having iodine adsorbed therein is well known and has been used as a polarizing film usually having a neutral gray color. Polarizing films of this type can be combined, for example, with liquid-crystal display units to produce monochromatic display devices, which are being utilized in a great variety of electronic calculators, instruments and the like.

In recent years, increasing importance is attached to the fashionability and differentiability of commercial products and the diversification of displayed information, and it is correspondingly demanded to develop colored polarizing films which permit information to be displayed in any desired color. It is conventionally known that such colored polarizing films can be obtained by coloring a film of a hydrophilic polymer (such as polyvinyl alcohol or the like) with a direct dye or acid dye having a water-soluble group and then stretching it uniaxially. These colored polarizing films are used by interposing them between a pair of transparent protective coats such as triacetate resin films, acrylic resin films or glass sheets. However, as the range of use of such polarizing films is extended in recent years, it is more urgently desired to improve not only their inherent performance such as polarizing power and the like, but also their durability such as light resistance, moisture resistance, thermal resistance and the like. As a result, the above-described colored polarizing films comprising a hydrophilic polymer film colored with a direct dye or an acid dye have proved to be incapable of satisfying the requirements of the market because there is a limit to the improvement of their durability.

In addition to the colored polarizing films comprising a hydrophilic polymer film colored with a direct dye or an acid dye, colored polarizing films comprising a hydrophobic polymer film colored with a dichromatic dye having a water-soluble group or an ionic group are also known (Japanese Patent Laid-Open Nos. 106743/'78 and 51701/'81). However, these colored polarizing films have not yet been put to practical use because their polarization performance is inferior to that of polarizing films of the PVA type and/or they require a complicated manufacturing procedure.

SUMMARY OF THE INVENTION

It is an object of the present invention to provide a colored polarizing film using a hydrophobic polymer as the base material.

It is another object of the present invention to provide a colored polarizing film having excellent durability from the viewpoint of thermal resistance, moisture resistance and the like.

It is still another object of the present invention to provide a very simple method of making a colored polarizing film using a hydrophobic, organic polymer as the base material and having excellent durability and unquestionable optical uniformity.

These and other objects of the present invention are accomplished by a colored polarizing film comprising (a) a hydrophobic, organic polymer film and (b) at least one dichroic dye having an azo, anthraquinone, thioindigo, perylene or phthalone structure containing no water-soluble group.

Thus, the colored polarizing film of the present invention can be made by coloring a hydrophobic, organic polymer film with the above-described dichroic dye according to any of various dyeing techniques and thereby imparting polarization thereto.

However, in making a colored polarizing film composed of a hydrophobic, organic polymer film and a dichroic dye, the effects exerted by the use of the hydrophobic resinous polymer can be further improved by blending (preferably, dry blending) the dichroic dye with the resinous polymer in advance, melting the resulting blend and forming it into a film, and then stretching the film in at least one direction.

DETAILED DESCRIPTION OF THE INVENTION

The hydrophobic, organic polymer film which constitutes one essential component of the colored polarizing film in accordance with the present invention can basically comprise any of various organic resinous compounds having a linear molecular structure. Preferably, halogenated vinyl polymer resins, partially dehydrochlorinated halogenated vinyl polymer resins, halogenated vinylidene polymer resins, partially dehydrochlorinated halogenated vinylidene polymer resins, polyamide resins and polyester resins may be used as base materials for the formation of films. It will be readily understood by those skilled in the art that, especially in the fields where moisture resistance is required, the use of a halogenated vinyl polymer, polyamide or polyester resin is preferred.

The other essential component of the colored polarizing film in accordance with the present invention is a dichroic dye having no water-soluble group.

These dichroic dyes are selected from the group consisting of dichromatic dyes having an azo, anthraquinone, thioindigo, perylene or phthalone structure containing no water-soluble group.

More specifically, such useful dichroic dyes include (1) dichroic anthraquinone dyes having a structure represented by the general formula

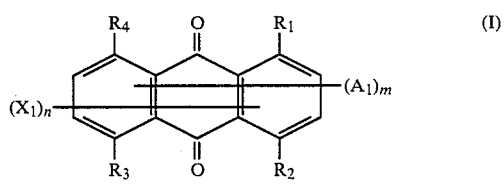

where $R_1$, $R_2$, $R_3$ and $R_4$ independently represent hydrogen atoms, hydroxy groups, nitro groups, halogen atoms or amino groups and at least one of the $R_1$, $R_2$, $R_3$ and $R_4$ radicals is an amino or hydroxy group, A represents an alkoxy group, an unsubstituted or substituted phenoxy group, an alkylamino group, an unsubstituted or substituted anilino group, a thioalkoxy group, an unsubstituted or substituted thiophenoxy group, a phenyl group substituted with an alkoxy group of 1 to 15 carbon atoms or a hydroxy group, an alkoxycarbonyl group, or an unsubstituted or substituted phenoxycarbonyl group, $X_1$ represents a halogen atom or a cyano group, and m and n independently represent whole numbers equal to 0, 1 or 2;

(2) dichroic anthraquinone dyes having a structure represented by the general formula

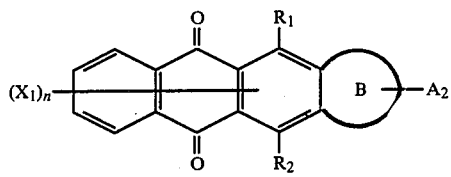

where $R_1$, $R_2$, $X_1$ and n have the same meanings as described for formula (I), B represents a five-membered ring of the formula

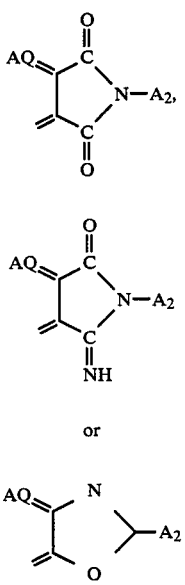

which ring is fused to the anthraquinone nucleus (AQ), and $A_2$ represents an alkyl group having 1 to 15 carbon atoms, a phenyl group, an alkyl- or alkoxy-substituted phenyl group, or an alkoxyalkyl group;

(3) dichroic phthalone dyes having a structure represented by the general formula

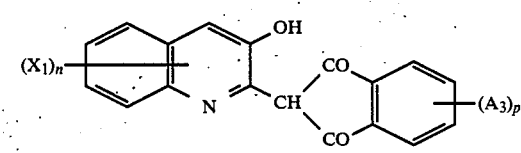

where $X_1$ and n have the same meanings as described for formula (I), $A_3$ represents a hydrogen atom, a halogen atom, an alkoxycarbonyl group, or an unsubstituted or substituted phenoxycarbonyl group, and p represents a whole number equal to 1 or 2;

(4) dichroic perylene dyes having a structure represented by the general formula

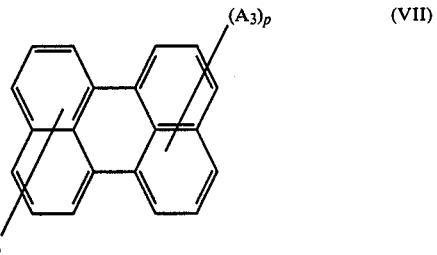

where $A_3$ and p have the same meanings as described for formula (VI).

(5) dichroic azo dyes having a structure represented by the general formula

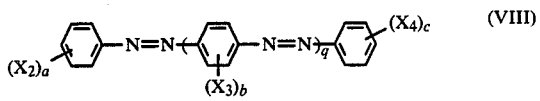

where $X_2$ represents a hydrogen atom, a halogen atom, a nitro group, a lower alkyl group, a lower alkoxy group or a cyano group, $X_3$ represents a hydrogen atom, a halogen atom, a lower alkyl group, a lower alkoxy group or a cyano group, $X_4$ represents a hydrogen atom, a hydroxy group, a lower alkoxy group, an amino group or a di(lower alkyl)amino group, a, b and c are whole numbers equal to 1, 2 or 3, and q is a whole number equal to 0, 1 or 2; and (6) dichroic thioindigo dyes having a structure represented by the general formula

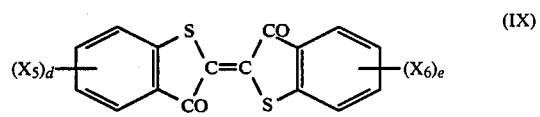

where $X_5$ and $X_6$ represent hydrogen atoms, halogen atoms, methyl groups, ethyl groups or alkoxycarbonyl groups, and d and e are whole numbers equal to 1, 2 or 3.

Specific examples of the above-described dichroic dyes having no water-soluble group are listed in Table 1.

TABLE 1

| Dye No. | Structural formula of dichroic dye | Color of light transmitted by crossed polarizing films |
|---|---|---|
| 1 | Perylene with $-COO-C_6H_4-C_8H_{17}$ and $H_{17}C_8-C_6H_4-OOC-$ substituents | Bright yellow |
| 2 | Perylene with $-COO-C_6H_4-C_4H_9$ and $H_9C_4-C_6H_4-OOC-$ substituents | Bright yellow |
| 3 | Perylene with $-COOC_4H_9$ and $H_9C_4OOC-$ substituents | Bright yellow |
| 4 | $O_2N-C_6H_4-N{=}N-C_6H_3(OCH_3)-N{=}N-C_6H_4-OCH_3$ | Orange-yellow |
| 5 | $C_6H_5-N{=}N-C_6H_4-N{=}N-C_6H_4-N(C_2H_5)_2$ | Reddish orange |
| 6 | Bis-benzo[1,3]dithiol-2-ylidene dione structure | Red |
| 7 | Dimethyl-substituted bis-benzo[1,3]dithiol-2-ylidene dione | Red |
| 8 | Methyl-substituted bis-benzo[1,3]dithiol-2-ylidene dione | Red |
| 9 | $\left[\text{3-hydroxyquinoline-2-CH-phthalide}\right]\text{-Br}_{1\sim3}$ | Yellow |

TABLE 1-continued

| Dye No. | Structural formula of dichroic dye | Color of light transmitted by crossed polarizing films |
|---|---|---|
| 10 | quinoline-CH(OH)=N-CH-CO-C₆H₃-COO-C₆H₅ (phthalimide-linked quinoline with phenyl ester) | Yellow |
| 11 | quinoline-CH(OH)=N-CH-CO-C₆H₃-COOC₄H₉ (phthalimide-linked quinoline with butyl ester) | Yellow |
| 12 | 1,4-dihydroxyanthraquinone-2-O-C₆H₄-$C_8H_{17}$ | Orange |
| 13 | 1,4-dihydroxyanthraquinone-2-O-C₆H₄-$C_4H_9$ | Orange |
| 14 | 1-amino-4-hydroxyanthraquinone-2-O-C₆H₅ | Red |
| 15 | 1-amino-4-hydroxyanthraquinone-2-O-C₆H₄-$C_4H_9$ | Red |
| 16 | 1-amino-4-hydroxyanthraquinone-2-O-C₆H₄-$OCH_3$ | Red |
| 17 | 1-amino-4-hydroxyanthraquinone-2-O-C₆H₄-Br | Red |

TABLE 1-continued
| Dye No. | Structural formula of dichroic dye | Color of light transmitted by crossed polarizing films |
|---|---|---|
| 18 | 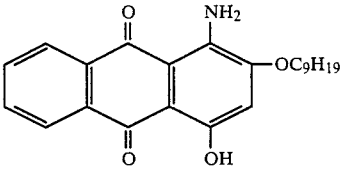 | Red |
| 19 | 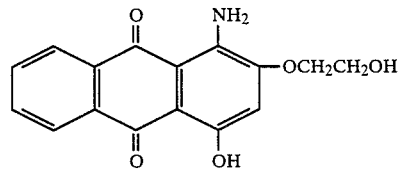 | Red |
| 20 | 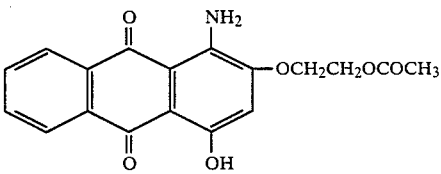 | Red |
| 21 | 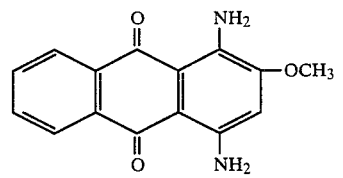 | Purple |
| 22 | 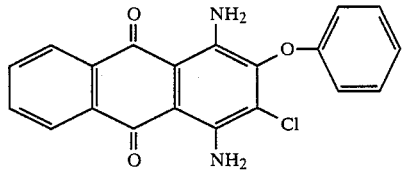 | Reddish violet |
| 23 | 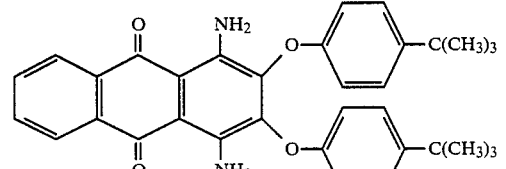 | Reddish violet |
| 24 | 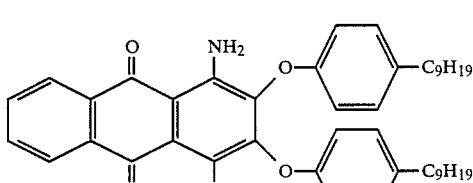 | Reddish violet |
| 25 | 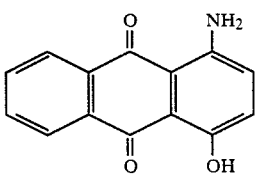 | Reddish violet |

TABLE 1-continued

| Dye No. | Structural formula of dichroic dye | Color of light transmitted by crossed polarizing films |
|---|---|---|
| 26 | 1-(methylamino)anthraquinone | Red |
| 27 | 1,5-bis(phenylamino)anthraquinone | Reddish violet |
| 28 | 1,5-bis(4-butylphenylamino)anthraquinone | Reddish violet |
| 29 | 1,5-bis(4-nonyloxyphenylamino)anthraquinone | Reddish violet |
| 30 | 1-(4-butylphenylamino)-4-hydroxyanthraquinone | Reddish violet |
| 31 | 1-(4-nonyloxyphenylamino)-4-hydroxyanthraquinone | Reddish violet |

TABLE 1-continued

| Dye No. | Structural formula of dichroic dye | Color of light transmitted by crossed polarizing films |
|---|---|---|
| 32 | 4-amino-2-cyclohexyl naphtho-oxazole anthraquinone with OH | Red |
| 33 | 4,?-diamino-2-t-butyl naphtho-oxazole anthraquinone with OH | Reddish violet |
| 34 | {1,5-diamino-4,8-dihydroxyanthraquinone}-Br$_{1\sim3}$ | Blue |
| 35 | 1,5-diamino-4,8-dihydroxyanthraquinone | Blue |
| 36 | 1-anilino-5-hydroxy-4-hydroxy-8-nitroanthraquinone | Blue |
| 37 | 1-amino-2-(4-hydroxyphenyl)-5-hydroxy-6-amino-8-hydroxyanthraquinone | Blue |
| 38 | 1,5-diamino-2-(4-ethoxyphenyl)-4,8-dihydroxyanthraquinone | Blue |
| 39 | 1-amino-2-(4-heptyloxyphenyl)-5-hydroxy-6-amino-8-hydroxyanthraquinone ($OC_7H_{15}$) | Blue |

TABLE 1-continued

| Dye No. | Structural formula of dichroic dye | Color of light transmitted by crossed polarizing films |
|---|---|---|
| 40 | 1-amino-5,8-diamino... anthraquinone with HO, OH, NH2, and 4-OC9H19-phenyl substituents | Blue |
| 41 | Analogous anthraquinone with 4-OH-phenyl substituent | Blue |
| 42 | Analogous anthraquinone with 4-OCH3-phenyl substituent | Blue |
| 43 | Analogous anthraquinone with 4-OC9H19-phenyl substituent | Blue |
| 44 | Anthraquinone with two 4-OCH3-phenyl substituents | Blue |
| 45 | Anthraquinone with two 4-OC7H15-phenyl substituents | Blue |
| 46 | 1,4-diamino-2-(COOC3H7)-anthraquinone | Blue |
| 47 | 1,4-diamino-2-(COO-4-CH3-phenyl)-anthraquinone | Blue |

TABLE 1-continued

| Dye No. | Structural formula of dichroic dye | Color of light transmitted by crossed polarizing films |
|---|---|---|
| 48 | 1,4-diamino-anthraquinone-2-COO-C6H4-C8H17 | Blue |
| 49 | 1,4-diamino-anthraquinone-2-CONH-C6H5 | Blue |
| 50 | 1,4-diamino-anthraquinone-2-CONHC4H9 | Blue |
| 51 | 1,4-diamino-anthraquinone-2-COO-cyclohexyl(H) | Blue |
| 52 | 1,4-diamino-anthraquinone-2,3-dicarboximide-N-C8H17 | Bright blue |
| 53 | 1,4-diamino-anthraquinone-2,3-dicarboximide-N-(CH2)3OCH3 | Bright blue |
| 54 | 1,4-diamino-anthraquinone-2,3-dicarboximide-N-C6H4-C4H9 | Bright blue |
| 55 | 1,4-diamino-anthraquinone-2,3-dicarboximide-N-C6H4-OC9H19 | Bright blue |

TABLE 1-continued

| Dye No. | Structural formula of dichroic dye | Color of light transmitted by crossed polarizing films |
|---|---|---|
| 56 | anthraquinone with NH₂, NH₂, CO-N(H)-C₆H₄-CH₃, C=NH substituents | Bright blue |
| 57 | anthraquinone with NH₂, NH₂, CO-N(CH₂)₃OCH₃, C=NH substituents | Bright blue |
| 58 | 1-amino-4-hydroxy-2-(COOC₄H₉)anthraquinone | Bluish violet |
| 59 | 1-amino-4-hydroxy-2-(COO-C₆H₄-C₈H₁₇)anthraquinone | Bright blue |
| 60 | 1,5-diamino-2,6-bis(COO-C₆H₄-C₈H₁₇)anthraquinone | Reddish violet |

The most important feature of the present invention lies in the application of water-insoluble dichroic dyes having any of the above-described structures to colored polarizing films. More specifically, the dichroic dyes which can be used in the present invention have a molecular structure elongated straight along the longitudinal axis of the molecule. Accordingly, these dyes exhibit a high degree of so-called dichromatism characterized in that visible light is strongly absorbed in the direction parallel to the molecular axis while it is scarcely absorbed in the direction perpendicular to the molecular axis. If such a dichroic dye is incorporated in an organic polymer film so that the molecules of the former are oriented in a fixed direction, there will be obtained a colored polarizing film showing a specific color and having excellent polarizing properties.

Since no polymer resins other than polyvinyl alcohol resin have been practically used as the base materials of conventional colored polarizing films, investigations have been directed only to the so-called direct dyes and acid dyes of a structure containing a water-soluble group (such as sulfonic group or the like) suitable for the dyeing of polyvinyl alcohol resin. Moreover, another factor having prevented the development of a colored polarizing film having excellent durability is that no water-insoluble colorants exhibiting a high degree of dichromatism have been available.

Now, the present inventors have found that certain water-insoluble dichroic dyes can be utilized to form colored polarizing films and have made it possible to satisfy the strong demand for colored polarizing films having improved performance and, in particular, improved durability.

More specifically, the present invention enables more durable polyvinyl chloride, polyamide and polyester resins to be used as the base material, instead of limiting the base material to polyvinyl alcohol which has hitherto been used in spite of some shortcomings (such as hygroscopicity and the like) possibly causative of a reduction in performance. In particular, a color polarizing film having very excellent durability can be obtained by combining a dichroic dye of the present invention with an organic polymer film formed of a polyvinyl chloride, polyamide or polyester base material.

The colored polarizing film of the present invention can be made according to any of various methods. More specifically, the colored polarizing film can be made, for example, by melting an organic polymer resin constituting the base material, coloring it with a dichroic dye of the present invention, forming the resulting blend into a film or sheet, and then stretching the film or sheet; by dissolving the aforesaid resin and dye in a heated organic solvent, casting the resulting solution on a flat plate, evaporating the organic solvent to form a film, and then stretching the film; by preforming the aforesaid resin into a film or sheet, dyeing the film or sheet in an aqueous or organic solvent dye bath containing a dichroic dye of the present invention, and then stretching the film or sheet; by printing the preformed film or sheet with a dye paste containing a dichroic dye of the present invention and then stretching the film or sheet; or by preparing a printing ink from a dichroic dye of the present invention, printing the preformed film or sheet with the ink, and then stretching the film or sheet. However, the colored polarizing film of the present invention can be made according to any desired method that is never limited to the above-described examples. No particular limitation is placed on the amount of dichroic dye used in the colored polarizing film of the present invention. However, where the polarizing film has a thickness ranging from several microns to several tens of microns, the dichroic dye is generally used in an amount of 0.01 to 5% by weight, preferably 0.01 to 2% by weight, based on the weight of the resin constituting the base material.

As described above, the colored polarizing film of the present invention can be made according to any of various methods. Among others, a colored polarizing film exhibiting a further improvement of the effects exerted by the use of a hydrophobic resinous polymer can be obtained by blending (preferably, dry blending) the dichroic dye with the resinous polymer in advance, melting the resulting blend and forming it into a film, and then stretching the film in at least one direction.

In order to color a hydrophobic polymer base material (such as a polyamide resin or the like) with a dichroic dye, it is necessary to dye it at elevated temperature (usually, 100° C. or above), as contrated with hydrophilic polymer base materials such as PVA and the like. Accordingly, the stretching operation may become difficult owing to the influence of thermal behavior (for example, crystallization) of the polymer. Moreover, even if the polymer can be dyed successfully, the resulting colored polarizing film may often be inferior in polarization performance to colored polarizing films of the PVA type.

In the present method of making a colored polarizing film, there may be used any resinous polymer that is a thermoplastic polymeric compound and can be formed into a transparent film. However, polymer compositions consisting essentially of hydrophobic polymers such as polyethylene terephthalate, Nylon 6, Nylon 12, Nylon 66, polyvinyl chloride, polystyrene, polymethyl methacrylate, polycarbonates, polyethers, polysulfones and the like are particularly preferred.

The dichroic dye used in this method can be any of the above-described water-insoluble azo, anthraquinone, thioindigo, perylene and phthalone dyes.

The term "dry blending" as used in this method means the process of mixing a dye (usually in the form of powder) with a resinous polymer base material (in the form of pellets, powder or the like) at ordinary or elevated temperatures by a suitable mixing means, the process of mixing and dispersing a dye in a molten resin, or the process of mixing a dye with a resinous base material (in the form of pellets, powder or the like) and thereby dyeing the base material by adsorption of the dye.

The expression "melting the blend and forming it into a film" means the process of melting the resulting blend of the above-described resinous polymer and dye by the application of heat and then forming it into a film by a suitable means such as extrusion or the like.

The term "stretching" means the process of using a suitable stretching apparatus to stretch the dye-containing resin film (in a substantially amorphous state) in one direction at an appropriate temperature higher than the glass transition temperature of the resin by as high a stretch ratio as possible. Under certain circumstances, the film may be stretched in a first direction (for example, in the longitudinal direction of the film), and then in a second direction forming an angle with the first one.

The method of the present invention is more specifically described hereinbelow with reference to one preferred embodiment thereof.

Using a Henschel mixer or a blender, one or more resinous polymers in the form of pellets, chips or powder are mixed with one or more dichroic dyes and this mixture is kneaded until it becomes homogeneous. During this step, additional components such as dispersants, stabilizers, ultraviolet light absorbers and the like may be added thereto. Alternatively, the surfaces of a resinous polymer base material can be dyed by soaking the resinous polymer (in the form of pellets, powder or the like), for example, in an aqueous dispersion of one or more dyes with vigorous stirring. The amount of the dye or dyes to be blended may be suitably determined so as to provide the color and contrast ultimately desired in the resulting polarizing film.

Then, the resulting blend is fed to an extruder equipped with a T-die or the like, melted by the application of heat, and extruded to form a film having a suitable thickness. The extruded film is solidified by cooling. It is desirable that this film has as low crystallinity as possible.

Thereafter, the film is stretched in one direction at an arbitrary temperature higher than the glass transition temperature of the polymer. In order to achieve the highest possible degree of orientation (of the molecular chains) in the stretch direction, it is preferable to carry out the stretching operation at a temperature higher than and close to the glass transition temperature. Although it is desirable to use as high a stretch ratio as possible, the film is generally stretched by a ratio of 1.1 or higher, depending on the composition of the polymer, film thickness, stretching speed and the like. Under certain circumstances, the film can further be stretched in the direction perpendicular to that of the previous stretching operation.

If desired, the stretched film may be heat-treated under tension or relaxation to improve its physical properties. This heat treatment is carried out at a temperature higher than the stretch temperature and lower than the melting point of the film, and the heat-treatment time may be arbitrarily determined in connection with the heat-treatment temperature.

The colored polarizing film made by the above-described method has not only polarization performance comparable to that of conventional PVA products, but also excellent moisture resistance, thermal resistance and weather resistance, so that it is useful in a variety of color display devices including color liquid-crystal display elements.

The colored polarizing film so made can be used as such, depending on the type of the base material or the intended purpose. However, this colored polarizing film may also be used by covering one or both sides thereof with a protective coat having optical clarity and high physical strength. This protective coat can be formed of a material selected from glasses and synthetic resins that have optical clarity and high physical strength (such as surface hardness and the like). As long as its optical clarity is secured, the protective coat may be colored and may contain ultraviolet light absorbers and other additives. Usually, the protective coat is bonded to the colored polarizing film with an adhesive (for example, polyvinyl acetate adhesive or the like) which does not impair the polarization of the polarizing film. Alternatively, the protective coat may also be formed by applying a polymerizable resin to the surfaces of the polarizing film and then curing it. Typical examples of the polymerizable resin include polymerizable acrylic resins and urethane resins.

Table 1 shows the relationships between the structural formula of each of various water-insoluble dichroic dyes in accordance with the present invention and the color of light transmitted by two polarizing films composed of a polyester base material and the dichroic dye and superposed in such a way that their stretch directions are perpendicular to each other. When the dichroic dyes of the present invention are used in the making of polarizing films, they may be used alone, as illustrated by the examples given in Table 1, or in combination to obtain a desired color. Moreover, the dichroic dyes of the present invention can also be used in combination with other dichroic dyes or non-dichroic dyes. Furthermore, under certain circumstances, the dichroic dyes of the present invention can also be used in combination with iodine or iodine compounds. In the practice of the present invention, these various combinations may be used without any restriction.

The present method of making colored polarizing films using a dichroic dye is further illustrated by the following examples.

In the following examples, the degree of polarization was determined as follows: Using a spectrophotometer (Model UV-200; Shimazu Seisakusho), light transmission at the maximum absorption wavelength of the dye was measured for two films oriented in such a way that their stretch directions were parallel to each other (T//) and two films oriented in such a way that their stretch directions were perpendicular to each other (T⊥). Then, the degree of polarization (V) was calculated according to the following equation.

$$V = \sqrt{\frac{T// - T\perp}{T// + T\perp}} \times 100 \ (\%)$$

EXAMPLE 1

A Nylon 6 resin was melted and extruded to form a film exhibiting practically no molecular orientation. According to the roll stretching method, this film was stretched threefold at 100°–110° C. in the direction of the film formation. The stretched film was dyed in light blue by soaking it in a 0.1% aqueous fine dispersion of dye No. 39 (Table 1) at 120° C. for 5 minutes. Then, using a stretching tester, the dyed film was further stretched twofold at 150° C. in the same direction as the previous stretch direction. Its degree of polarization at the maximum absorption wavelength of 648 nm was 91%, indicating that the film had good polarizing properties.

When this polarizing film was allowed to stand at a temperature of 80° C. and a relative humidity of 90% for 2 weeks, it showed little reduction in the degree of polarization and proved to have excellent moisture resistance.

EXAMPLE 2

A mixture consisting of 500 parts of a polyethylene terephthalate resin and 2 parts of dye No. 14 (Table 1) was kneaded well. The resulting blend was melted and extruded to form a film. Using a stretching tester, this colored film was stretched sixfold at 90°–120° C. in the direction of the film formation.

When measured in the same manner as in Example 1, its degree of polarization at a wavelength of 550 nm was 75%, indicating that the film had good polarizing properties. When this film was allowed to stand at a temperature of 80° C. and a relative humidity of 90% for 2 weeks, it showed little reduction in the degree of polarization and proved to have excellent moisture resistance.

EXAMPLE 3

Two grams of dye No. 1 (Table 1) was added to and mixed with 1 kg of polyethylene terephthalate resin pellets. The resulting homogeneous blend was melted and extruded to form a film having a thickness of about 100 microns. Using a tentering machine, this film was stretched fivefold at 80° C. in the transverse direction and then heat-treated at 180° C. for several seconds. Thus, there was obtained a bright-yellow polarizing film exhibiting a high degree of polarization of 85% at the maximum absorption wavelength of 480 nm. When this polarizing film was allowed to stand at a temperature of 80° C. and a relative humidity of 90% for 2 weeks, it showed practically no change in color and practically no reduction in the degree of polarization.

In examples 4–25, polarizing films were made in the same manner as described in Example 3, except that other dyes listed in Table 1 were used in place of dye No. 1. The results thus obtained are summarized in the following table.

| Example No. | Dye No. | Maximum absorption wavelength (nm) | Degree of polarization (%) |
| --- | --- | --- | --- |
| 4 | 4 | 435 | 82 |
| 5 | 5 | 515 | 93 |
| 6 | 6 | 550 | 75 |
| 7 | 9 | 455 | 67 |
| 8 | 10 | 452 | 73 |
| 9 | 16 | 550 | 76 |
| 10 | 19 | 515 | 72 |
| 11 | 22 | 550 | 68 |
| 12 | 24 | 585 | 75 |
| 13 | 27 | 545 | 65 |
| 14 | 30 | 590 | 60 |
| 15 | 32 | 506 | 75 |
| 16 | 34 | 635 | 60 |
| 17 | 40 | 640 | 93 |
| 18 | 42 | 640 | 79 |
| 19 | 44 | 640 | 82 |
| 20 | 47 | 640 | 82 |
| 21 | 49 | 600 | 65 |
| 22 | 52 | 683 | 71 |
| 23 | 54 | 685 | 80 |
| 24 | 57 | 670 | 69 |
| 25 | 59 | 580 | 78 |

EXAMPLE 26

Using a Henschel mixer, 1 g of each of the dichroic dyes (in the form of powder) listed in Table 2 was mixed with 1 kg of pellets of a polyethylene terephthalate resin (having an intrinsic viscosity of 0.67). The resulting homogeneous mixture was fed to an extruder of 40 mm diameter, melted at 280° C. and extruded to form a film having a thickness of about 100 microns. Thereafter, using a roll stretching machine, this film was stretched about fivefold at approximately 80° C. in the longitudinal direction and then heat-treated at approximately 200° C. for several seconds.

The degree of polarization of each stretched film was determined and the results thus obtained are shown in Table 2. These results indicate that, although the values slightly vary according to the type of the dye, all of the stretched films exhibited a satisfactorily high degree of polarization.

Example 26, the stretched film was dyed at approximately 100° C. for several minutes. The degree of polarization of each dyed film was determined and the results thus obtained are also shown in Table 2. It is evident from these results that the polarizing films obtained in this Comparative Example were inferior to those obtained in Example 26.

EXAMPLE 27

Using a ribbon blender, 1 g of dye No. 40 or No. 5 (in the form of powder) listed in Table 3 was mixed with 1 kg of a Nylon 6 resin (commercially available from Toray Co. under the trade name of "Amilan CM-1021XF"). The resulting homogeneous mixture was fed to an extruder of 40 mm diameter, melted at 260° C. and extruded to form a film having a thickness of about 150 microns. Then, using a hot-air stretching machine, this film was stretched about fourfold at 120° C. in the longitudinal direction. As shown in Table 3, the resulting films exhibited a satisfactorily high degree of polarization.

TABLE 2

Comparison of the Performance of Colored Polarizing Films Using a PET Resin

| Dye No. in Table 1 | Structural formula of dye | Color | Maximum absorption wavelength (nm) | Degree of polarization [v] (%) Example 26 | Degree of polarization [v] (%) Comparative Example |
|---|---|---|---|---|---|
| No. 40 | 1-amino-5-amino-4,8-dihydroxy-anthraquinone with $OC_9H_{19}$-phenyl substituent | Blue | 640 | 93 | 46 |
| No. 38 | 1-amino-5-amino-4,8-dihydroxy-anthraquinone with $OC_2H_5$-phenyl substituent | Blue | 640 | 88 | 43 |
| No. 18 | 1-amino-4-hydroxy-anthraquinone with $OC_9H_{19}$-phenyl substituent | Pink | 520 | 91 | 48 |
| No. 5 | phenyl-N=N-phenyl-N=N-phenyl-$N(C_2H_5)_2$ | Brown | 515 | 93 | 52 |
| No. 23 | 1,4-diamino-2,3-bis(4-tert-butylphenoxy)anthraquinone | Purple | 585 | 81 | 38 |

COMPARATIVE EXAMPLE

The same polyethylene terephthalate resin as used in Example 26 was melted and formed into a film having a thickness of about 80 microns. This film was stretched about fivefold at approximately 80° C. Using an aqueous dispersion containing each of the same dyes as used in

TABLE 3
Degree of Polarization (%) of Colored Polarizing Films Using a Uniaxially Stretched Nylon 6 Film

| Dye No. | Color | Maximum absorption wavelength (nm) | Degree of polarization (%) [Example 27] |
| --- | --- | --- | --- |
| No. 40 | Blue | 640 | 96 |
| No. 5 | Brown | 515 | 93 |

What is claimed is:

1. A method of making a polarizing film wherein a hydrophobic polymer is mixed with at least one water-soluble dichroic dye, melted, extruded, and formed into a homogeneously colored film followed by being stretched in one direction, characterized in that:

(a) said hydrophobic polymer is selected from the group consisting of polyvinyl chloride resins, polyamide resins and polyester resins, said polarizing film formed by said polymer being stretched in one direction; and (b) said water insoluble dichroic dye has a structure represented by:

(1) the general formula (I):

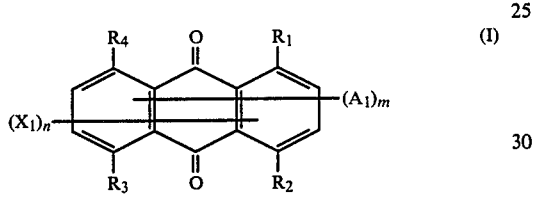

wherein $R_1$, $R_2$, $R_3$, and $R_4$ each independently is a hydrogen atom, an hydroxy group, a nitro group, a halogen atom or an amino group and at least one of the $R_1$, $R_2$, $R_3$, and $R_4$ radicals is an amino group or an hydroxy group, $A_1$, is an alkoxy group —OCH$_2$CH$_2$OH, —OCH$_2$C-H$_2$OOCCH$_3$,

wherein $R_5$ is a hydrogen atom, an alkyl group having 1 to 9 carbon atoms, a halogen atom or —OCH$_3$, an alkylamino group,

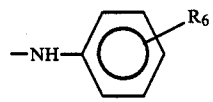

wherein $R_6$ is a hydrogen atom, an alkyl group having 1 to 4 carbon atoms, or an alkoxy group having 1 to 9 carbon atoms, a phenyl group substituted with an alkoxy group of 1 to 15 carbon atoms, a hydroxy group, an alkoxycarbonyl group

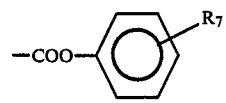

wherein $R_7$ is a hydrogen atom, or an alkyl group having 1 to 8 carbon atoms, or —CONHR$_8$ wherein $R_8$ is an alkyl group having 1 to 4 carbon atoms or a phenyl groupp, $X_1$ is a halogen atom or a cyano group, and m and n each independently is a whole number equal to 0, 1 or 2; or (ii) the general formula (II):

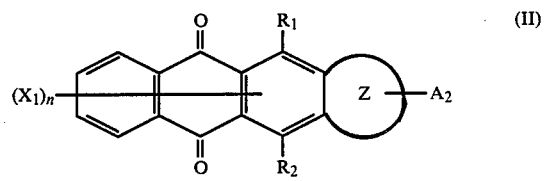

wherein $R_1$, $R_2$, $X_1$ and n have the same meanings as described for formula (I), Z is a five-membered ring of the one of the formulas:

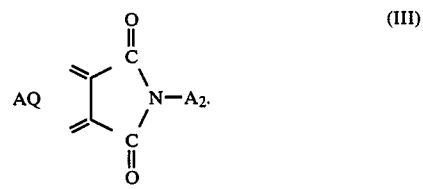

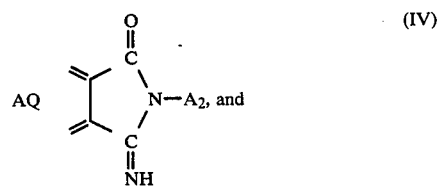

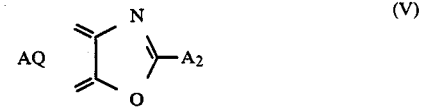

which ring is fused to the anthroquinone nucleus (AQ), and $A_2$ is an alkyl group having 1 to 15 carbon atoms, a phenyl group, an alkylsubstituted phenyl group, an alkoxyalkyl group; or (iii) the general formula (VI):

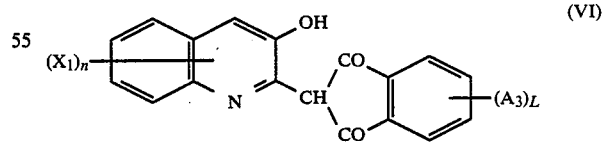

wherein $X_1$ and n have the same meanings as described for formula (I), $A_3$ is a hydrogen atom, a halogen atom, an alkoxycarbonyl group, an unsubstituted phenoxycarbonyl group or a substituted phenoxycarbonyl group, and L is a whole number equal to 1 or 2; or (iv) the general formula (VII):

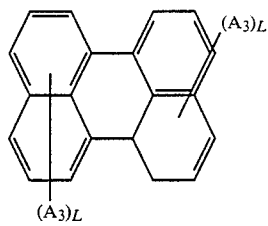

(VII)

wherein $A_3$, and L have the same meanings as described for formula (VI); or (v) the general formula (VIII)

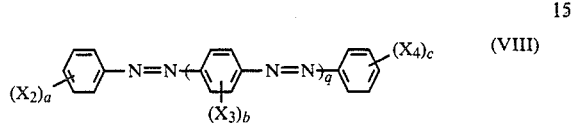

wherein $X_2$ is a hydrogen atom, a halogen atom, a nitro group, a lower alkyl group, a lower alkoxy group or a cyano group, $X_3$ is a hydrogen atom, a halogen atom, a lower alkyl group, a lower alkoxy group or a cyano group, $X_4$ is a hydrogen atom, a hydroxy group, a lower alkoxy group, an amino group or a di(lower alkyl) amino group, a, b and c each independently is a whole number equal to 1, 2 or 3, and q is a whole number to 0, 1 or 2; or (vi) the general formula (IX):

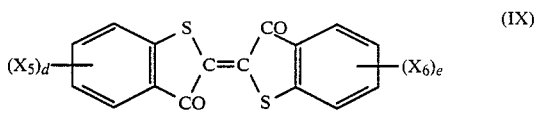

wherein $X_5$ and $X_6$ each independently is a hydrogen atom, a halogen atom, a methyl group, an ethyl group or an alkoxycarbonyl group, and d and e each independently is a whole number equal to 1, 2 or 3; and (c) said polarizing film has a degree of polarization of about 60 or greater.

2. A method of making a polarizing film as claimed in claim 1 wherein the resinous polymer is a polyester resin.

3. A method of making a polarizing film as claimed in claim 1 wherein the resinous polymer is a polyamide resin.

* * * * *